(12) United States Patent
Prados et al.

(10) Patent No.: US 9,665,175 B2
(45) Date of Patent: May 30, 2017

(54) INPUT DEVICE HAVING HAPTIC FEEDBACK

(75) Inventors: Michael Prados, San Francisco, CA (US); Sven Strohband, Mountain View, CA (US)

(73) Assignee: VOLKSWAGEN AG, Wolfsburg (DE)

( * ) Notice: Subject to any disclaimer, the term of this patent is extended or adjusted under 35 U.S.C. 154(b) by 1125 days.

(21) Appl. No.: 11/553,666

(22) Filed: Oct. 27, 2006

(65) Prior Publication Data

US 2007/0097094 A1    May 3, 2007

(51) Int. Cl.
| | | |
|---|---|---|
| G06F 3/01 | (2006.01) | |
| G06F 3/041 | (2006.01) | |
| G06F 3/0488 | (2013.01) | |
| H01H 9/18 | (2006.01) | |

(52) U.S. Cl.
CPC ............ *G06F 3/016* (2013.01); *G06F 3/0412* (2013.01); *G06F 3/0488* (2013.01); *H01H 9/181* (2013.01)

(58) Field of Classification Search
CPC ...... G06F 3/016; G06F 3/0412; G06F 3/0488; H01H 9/181
USPC ..... 345/173, 174, 156, 347; 178/18.1, 18.05
See application file for complete search history.

(56) References Cited

U.S. PATENT DOCUMENTS

| | | | |
|---|---|---|---|
| 4,044,186 A | 8/1977 | Stangeland | 428/167 |
| 4,885,565 A | 12/1989 | Embach | 340/407.2 |
| 6,072,475 A | 6/2000 | Van Ketwich | 345/173 |
| 6,118,435 A * | 9/2000 | Fujita et al. | 345/173 |
| 6,369,803 B2 * | 4/2002 | Brisebois et al. | 345/173 |
| 6,512,512 B1 * | 1/2003 | Blanchard | 345/173 |
| 6,597,412 B1 | 7/2003 | Buzak et al. | 349/32 |
| 6,674,419 B2 | 1/2004 | Ilcisin et al. | 345/66 |
| 6,842,170 B1 | 1/2005 | Akins et al. | 345/173 |
| 2001/0038430 A1 * | 11/2001 | Mizunuma et al. | 349/123 |
| 2003/0231170 A1 * | 12/2003 | Yoshikawa et al. | 345/173 |
| 2004/0130442 A1 * | 7/2004 | Breed | B60C 11/24 340/443 |
| 2005/0024342 A1 * | 2/2005 | Young | 345/173 |
| 2005/0179827 A1 * | 8/2005 | Scharenbroch et al. | 349/16 |
| 2006/0146012 A1 * | 7/2006 | Arneson et al. | 345/156 |

FOREIGN PATENT DOCUMENTS

| | | | |
|---|---|---|---|
| DE | 2349499 | 4/1974 | F16S 1/04 |
| DE | 10011433 A1 | 10/2000 | G02F 1/1333 |
| DE | 20102197 U1 | 7/2001 | G06F 3/037 |
| DE | 10 2004 031 334 A1 | 1/2006 | B60K 37/02 |
| EP | 0920704 B1 | 10/2004 | H01H 13/70 |
| EP | 1560102 A2 | 8/2005 | G06F 3/033 |
| WO | 02/094729 A1 | 11/2002 | C03C 17/00 |

OTHER PUBLICATIONS

German Search Report and Written Opinion for German Patent Application No. 10 2006 038 293.5 (4 pages), Mar. 28, 2007.

* cited by examiner

*Primary Examiner* — Shaheda Abdin
(74) *Attorney, Agent, or Firm* — Slayden Grubert Beard PLLC (57) ABSTRACT

An input device, especially for a motor vehicle, has a display for the visual representation of information, a touch screen arranged above the display for the input of commands by touching an operating surface of the touch screen, and a layer having adjustable transparency arranged between the display and the touchscreen.

18 Claims, 5 Drawing Sheets

INPUT DEVICE HAVING HAPTIC FEEDBACK

CROSS-REFERENCE TO RELATED APPLICATIONS

This application claims the benefit of U.S. Provisional Application No. 60/731,033 filed on Oct. 28, 2005 entitled "NAVIGATIONSSYSTEM FUR EIN KRAFT-FAHRZEUG", which is incorporated herein in its entirety.

TECHNICAL FIELD

The invention relates to an input device, especially for a motor vehicle, said input device comprising a touch screen.

BACKGROUND

A touch screen is known, e.g., from DE 201 02 197 U1. DE 201 02 197 U1 discloses a touch screen for visually representing electronic signals and for inputting signs and symbols by touching the screen for confirmation purposes. It includes a functional plane for visual representation and keystroke input and a higher-level protective plane corresponding thereto that is deformable at certain points. In this context, when certain points of the functional plane are selected by a touching-type contact across the protective plane, at least one confirmation signal is generated for the user's sense of touch (haptic stimulus) that is perceptible at the position of the point of contact in the deformed protective plane, and the confirmation signal for the sense of touch (haptic stimulus) is generated by vibration elements eccentrically positioned within and/or underneath the functional plane. In addition, in the touch screen described in DE 201 02 197 U1, the generated vibrations are transmitted from the functional plane to the protective plane as the result of direct contacting of the two planes and/or via the edge regions of the planes by way of rigid or elastic connection elements.

In addition, touch screens are known, e.g., from U.S. Pat. No. 4,885,565 and EP 920 704 B1. Suitable touch screens can be obtained e.g., from 3M™ (see www.3m.com). Further details concerning touch screens may be gathered, for example, from EP 1 560 102 A1.

SUMMARY

It is an object of the invention to improve an input device comprising a touchscreen. It is desirable to create an input device, which is especially well-suited for motor vehicles.

The aforementioned object is attained by an input device, especially for a motor vehicle, said input device comprising a display for the visual representation of information, a touch screen arranged above the display for the input of commands by touching an operating surface of the touch screen and a layer having adjustable transparency arranged between the display and the touch screen.

In one design form of the invention, the layer having adjustable transparency comprises CLC (cholesteric liquid crystal), PDLC (polymer dispersed liquid crystal) and/or PALC(plasma addressed liquid crystal). PALC layers are disclosed in U.S. Pat. No. 6, 674,419 which is hereby incorporated by reference and U.S. Pat. No. 6,597,412 which is hereby incorporated by reference.

In another design form of the invention, the layer having adjustable transparency can assume an opaque state.

In another design form of the invention, the layer having adjustable transparency can assume an opaque state by means of an adjustable polarization.

In another design form of the invention, the transparency of the layer having adjustable transparency can be adjusted by means of a voltage.

In another design form of the invention, the input device comprises a control unit for adjusting the transparency of the layer having adjustable transparency in such a way that the latter is transparent when information is represented by means of the display, wherein provision can be made for the layer having adjustable transparency to be transferable by means of the control unit into an opaque state if no information is represented by means of the display.

In another design form of the invention, the operating surface of the touch screen comprises a hydrophobic coating.

The aforementioned object is additionally attained by an input device, especially for a motor vehicle, said input device comprising a display for the visual representation of information and a touch screen arranged above the display for the input of commands by touching an operating surface of the touchscreen, said operating surface of the touchscreen comprising a hydrophobic coating.

A touchscreen within the meaning of the invention is especially a transparent touch screen. A display within the meaning of the invention is especially a display or matrix display for the variable representation of information. A display within the meaning of the invention can be e.g., a TFT.

A motor vehicle within the meaning of the invention is especially a land vehicle, which can be used individually in road traffic. Motor vehicles within the meaning of the invention are especially not limited to land vehicles having an internal combustion engine.

BRIEF DESCRIPTION OF THE DRAWINGS

Additional advantages and details will become apparent from the following description of example embodiments.

DETAILED DESCRIPTION

Figure 1:
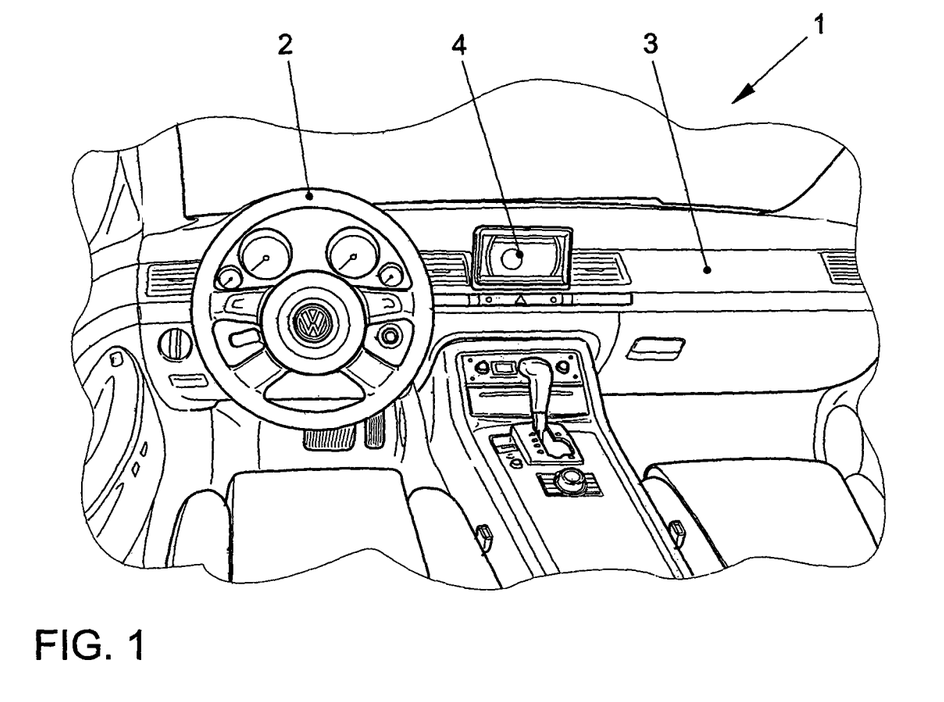
FIG. 1 illustrates an example embodiment for a cockpit of a motor vehicle.

FIG. 1 illustrates the interior view of an example embodiment for a motor vehicle 1. A steering wheel 2 is arranged below a dashboard 3 in the motor vehicle 1. The dashboard 3 comprises an input device 4 arranged adjacent to the steering wheel 2.

Alternatively or additionally, an input device corresponding to the input device 4 can also be arranged in the steering wheel 2.

Figure 2:
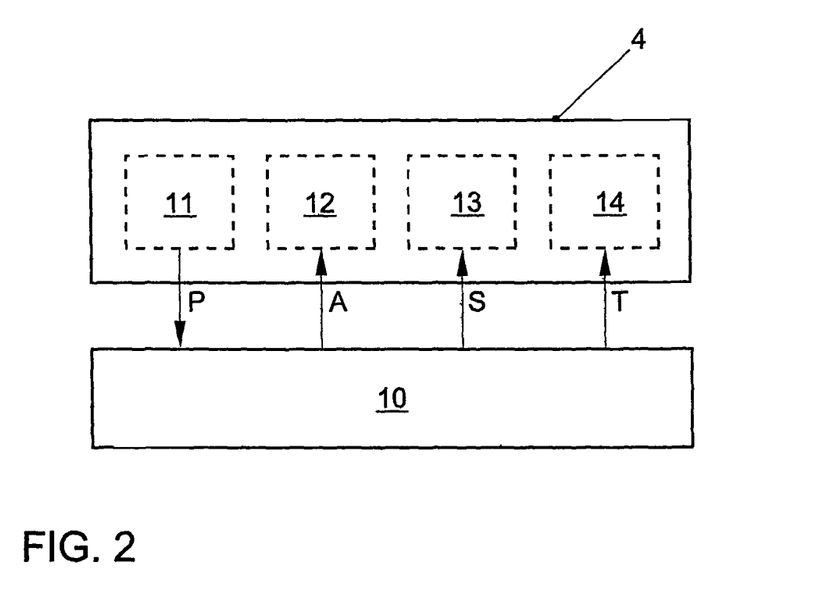
FIG. 2 is the schematic diagram of an example embodiment of an input device having an assigned control unit.
Figure 3:
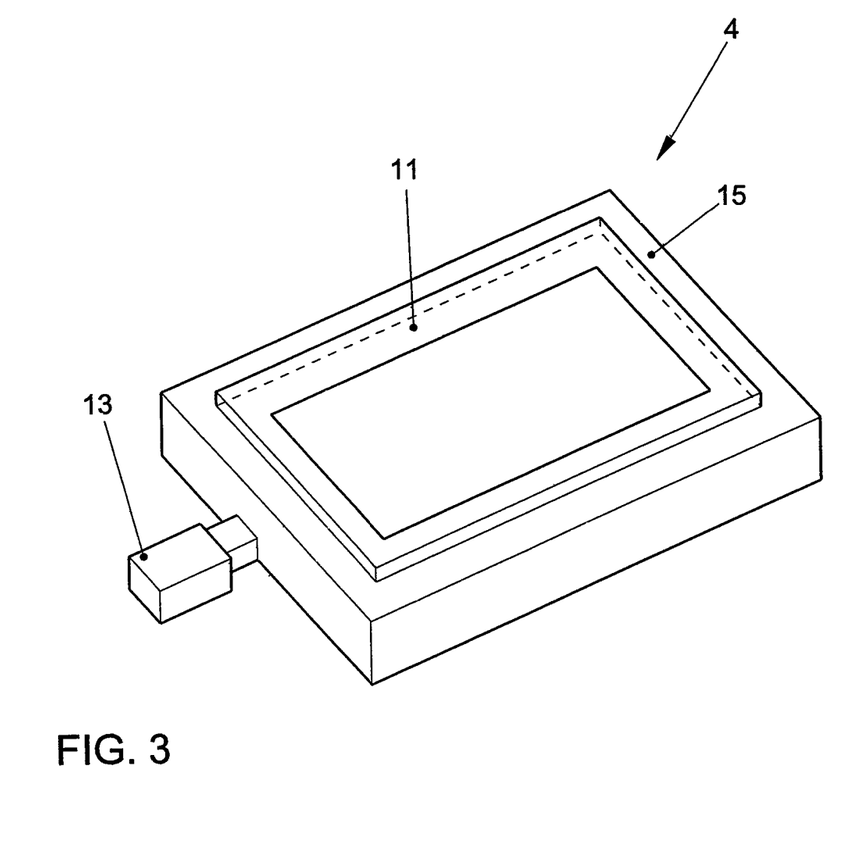
FIG. 3 illustrates a perspective plan view of the input device shown in FIG. 2.
Figure 4:
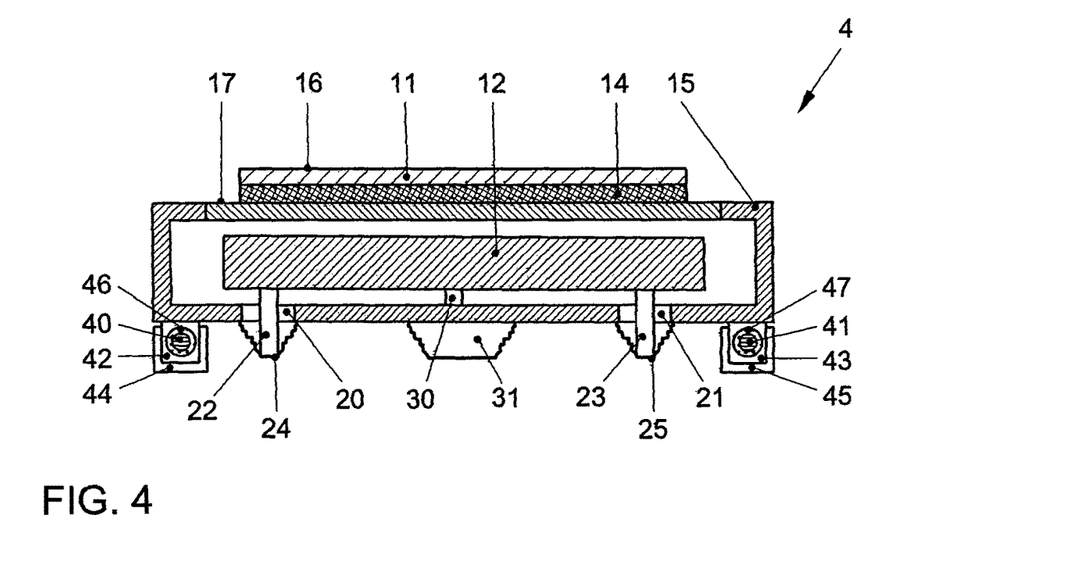
FIG. 4 illustrates the cross-section of the input device shown in FIG. 2.
Figure 5:
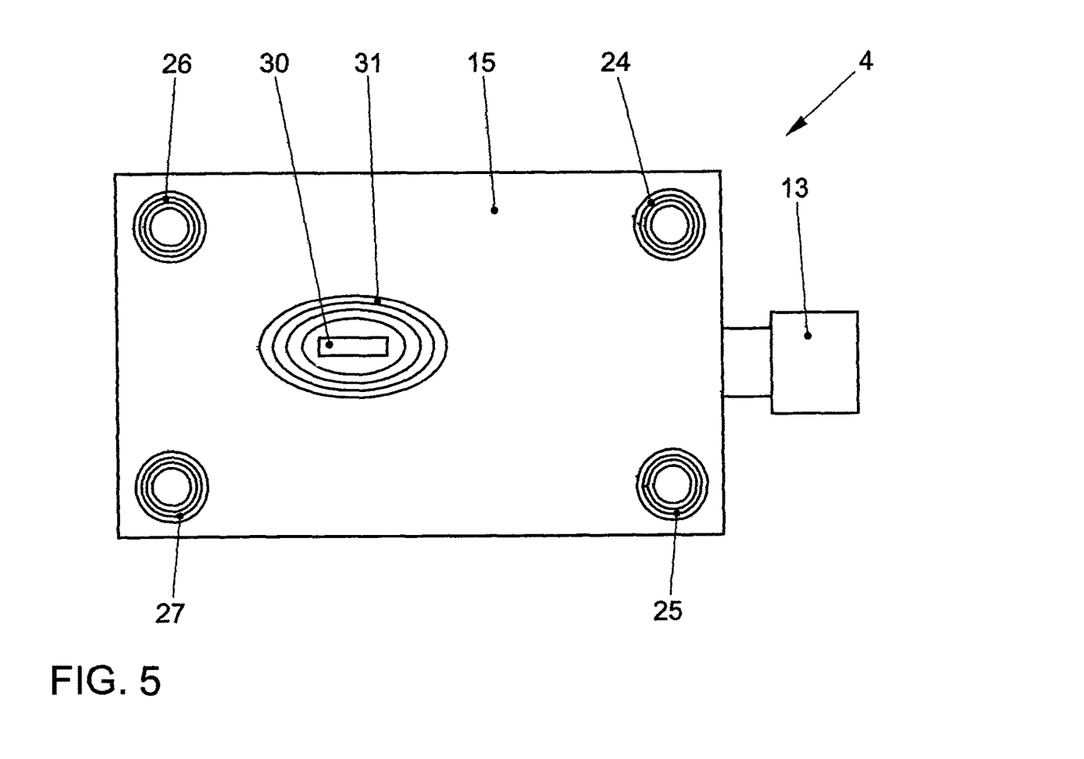
FIG. 5 illustrates the input device shown in FIG. 2 from below.
Figure 6:
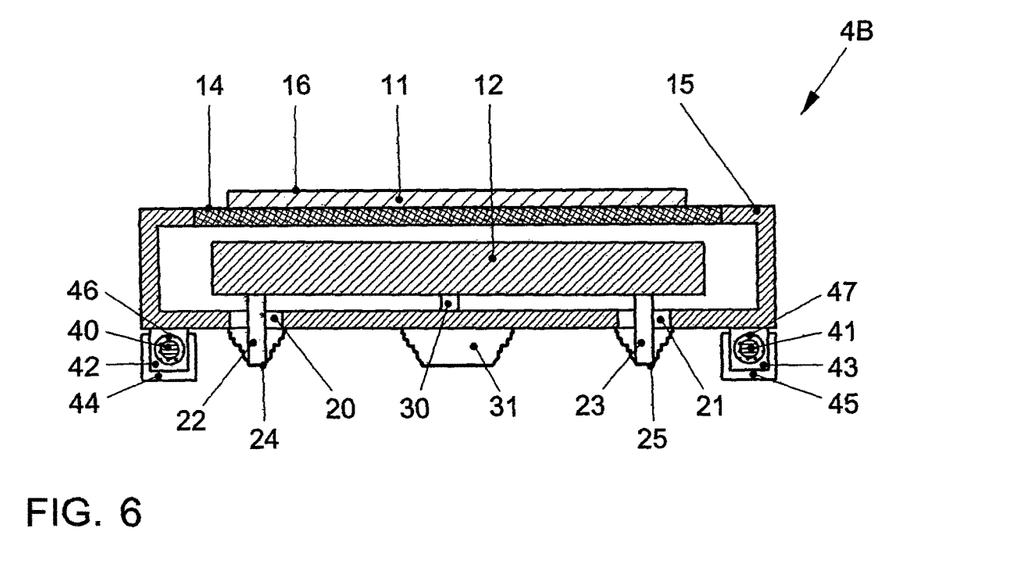
FIG. 6 illustrates the cross-section of an alternative input device.
Figure 7:
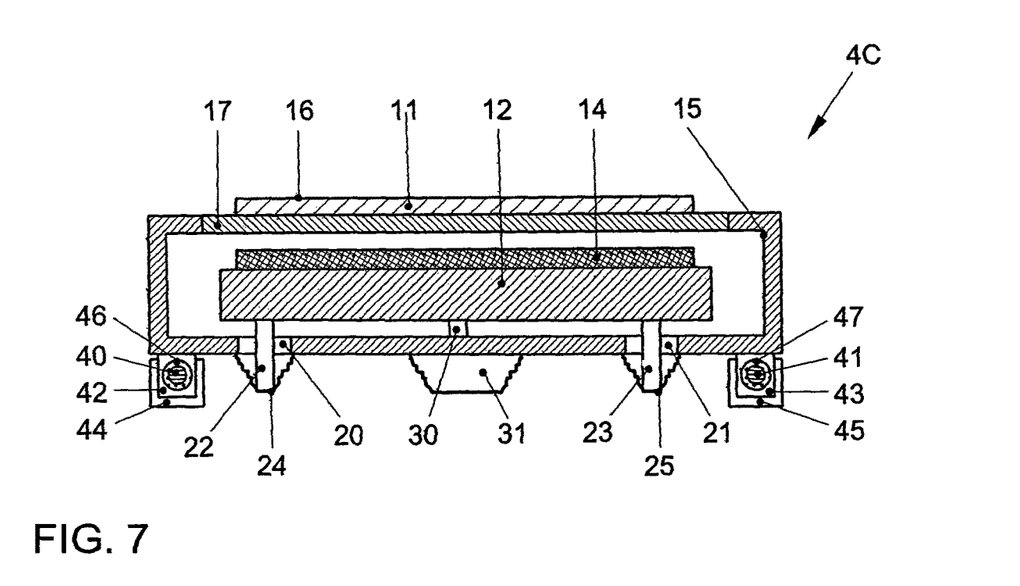
FIG. 7 illustrates the cross-section of another alternative input device.
Figure 8:
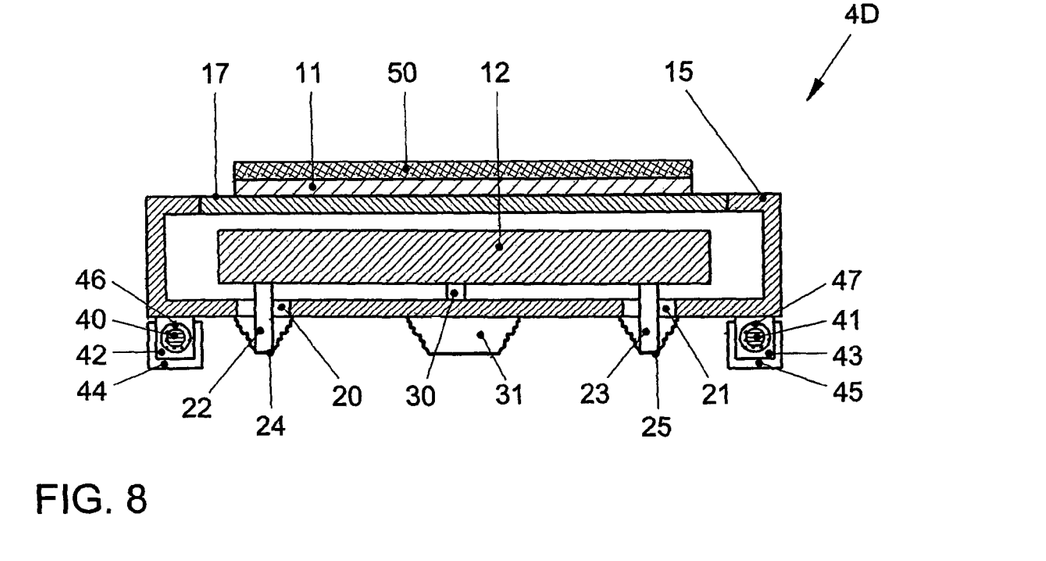
FIG. 8 illustrates the cross-section of another alternative input device.
Figure 9:
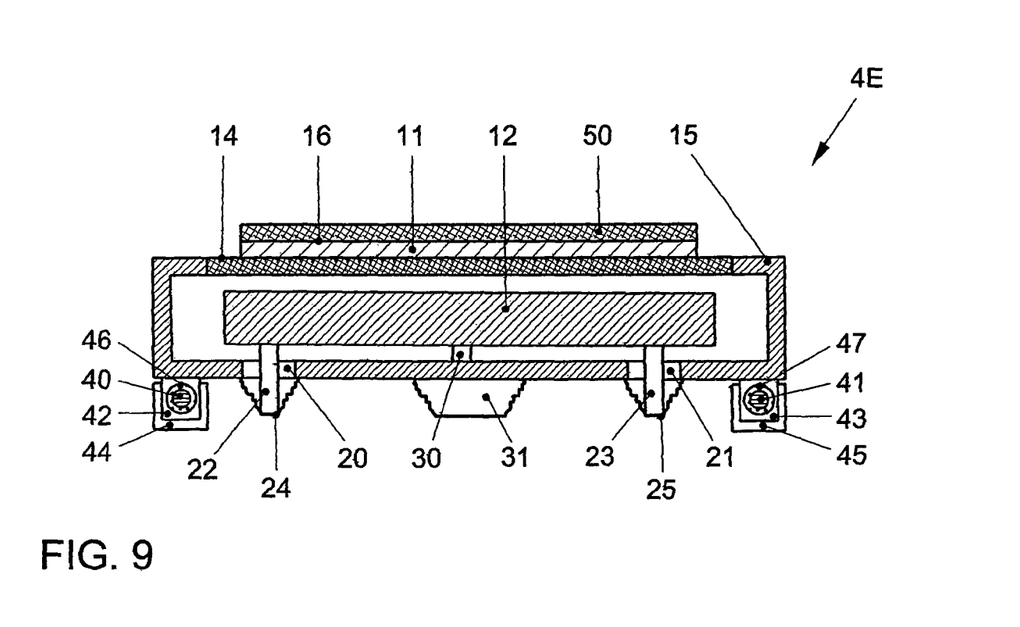
FIG. 9 illustrates the cross-section of another alternative input device.

FIG. 2 is a schematic diagram of the input device 4. FIG. 3 illustrates a perspective plan view of the input device 4. FIG. 4 illustrates the cross-section of the input device 4. FIG. 5 illustrates the input device 4 from below. The input device 4 comprises a housing 15, a display 12 arranged in the housing 15 for the visual representation of information and operating elements, a touch screen 11 arranged above the display 12 and connected to the housing for detecting a touching of the touch screen and for inputting of commands by touching an operating surface 16 of the touch screen 11 and an actuator 13 for moving the housing 15 and thus the touch screen 11 in relation to the display 12. The input device 4 comprises a control unit 10, by means of which different information can be represented by generating a corresponding display signal A on the display 12. Furthermore, the control unit 10 reads in a positional signal P generated by the touch screen 11, said positional signal indicating the position of a touching of the operating surface 16 or a pressing on the operating surface 16. In addition, the control unit 10 controls the motion of the actuator 13 by generating an actuator control signal S. The design of the actuator 13 can be inferred from e.g., EP 1 560 102 A1. In addition, e.g., piezo actuators or so-called voice coils can also be used as the actuator 13.

The touch screen 11 is fixed to the housing 15 outside. The housing 15 is transparent at least in the region indicated by reference numeral 17 below the touch screen 11. A layer 14 having adjustable transparency is arranged between the touch screen 11 and the region indicated by reference numeral 17 below the touch screen 11 and thus between the touch screen 11 and the display 12. This layer 14 having adjustable transparency comprises CLC (cholesteric liquid crystal), PDLC (polymer dispersed liquid crystal) and/or PALC or is made of CLC (cholesteric liquid crystal), PDLC (polymer dispersed liquid crystal) or PALC. A PALC layer can assume an opaque or a transparent state by adjusting its polarization as a function of an applied voltage.

For adjusting the transparency of the layer 14 having adjustable transparency, the control unit generates a transparency control signal T (with different voltage levels), so that the layer 14 having adjustable transparency is transparent if information is represented by means of the display 12 or if the display 12 emits light, and the layer 14 having adjustable transparency is opaque if no information is represented by means of the display or if the display 12 does not emit any light.

As illustrated in FIG. 4 and FIG. 5, the housing 15 comprises four openings 20 and 21, each of which is covered by a flexible sleeve 24, 25, 26 and 27 and through which mounting elements 22 and 23 are guided for fixing the display 12 on the steering wheel 2 or the dashboard 3. The housing 15 further comprises another opening, which is covered by another flexible sleeve 31 and through which a plug contact 30 is guided for the energy supply of the display 12 and for transmitting the display signal A to the display 12. The flexible sleeves 24, 25, 26, 27 and 31 can be made e.g., of an elastomer or can comprise an elastomer. Provision is made especially for adapting the flexibility of the sleeves 24, 25, 26, 27 and 31 to the mass of the housing 15 including the touch screen 11 in such a way that the housing 15 (including the touch screen 11) together with the sleeves 24, 25, 26, 27 and 31 has a mechanical natural frequency of 5 Hz to 150 Hz. In this context, the natural frequency is especially adapted to the actuator 13 or the actuator 13 is selected correspondingly to the natural frequency.

The input device 4 comprises connection elements for the form-fit connection of the housing 15 to the display 12 so that the housing 15 can only move along a straight line in relation to the display 12. For this purpose, a connection element comprises at least one mounting element 44 or 45, which is or can be connected to the steering wheel 2 or to the dashboard 3 for fixing each of the rods 40 and 41. In addition, every connection element comprises at least one sliding element 42 and/or 43, which is connected to the housing 15 and having at least one slide bearing 46 and/or 47, by means of which the sliding element 42 and/or 43 can move along the rod 40 and/or 41. Provision can also be made for the sliding element 42 and/or 43 to be connected or connectable to the steering wheel 2 or to the dashboard 3 and for connecting the mounting element 44 and/or 45 to the housing 15 (permanently). The moving connection between the display 12 and the housing 15 can be implemented using the steering wheel 2 or the dashboard 3 or using an additional element. In this connection, e.g., both the sliding elements 42 and 43 as well as the mounting elements 44 and/or 45 can be fixed to a frame. This frame can in turn be connected to the steering wheel 2 or to the dashboard 3 for installation in the motor vehicle 1.

In an alternative design, the input device 4 comprises an aforementioned display, an aforementioned touch screen arranged above the display and also a flexible element arranged between the display and the touch screen for preventing particles from penetrating between the display and the touch screen. In addition, the input device comprises an aforementioned actuator for moving the touch screen in relation to the display in at least a direction that is parallel especially in relation to the operating surface of the touch screen. The flexible element is advantageously arranged at the edge of the touch screen in such a way that it substantially does not hide the display surface of the display. In an advantageous design, the flexible element exhibits a rigidity, which is adapted in such a way to the mass of the touch screen that the touch screen together with the flexible element has a mechanical natural frequency between 5 Hz and 150 Hz in the movement direction. The flexible element can be made of a foamed material, such as e.g., polyurethane or an elastomer. The flexible element can be designed according to U.S. Pat. No. 4,044,186 or the corresponding patent specification DE 2 349 499.

FIG. 6, FIG. 7, FIG. 8 and FIG. 9 illustrate cross-sections of alternative input devices 4B, 4C, 4D and 4E respectively, the same reference numerals as in FIG. 2, FIG. 3, FIG. 4 and FIG. 5 indicating the same or similar objects. The input device 4B illustrated in FIG. 6 comprises a layer 14 having adjustable transparency instead of the region indicated by reference numeral 17 below the touchscreen 11. Said layer having adjustable transparency is thus also arranged between the touch screen 11 and the display 12. In the input device 4C illustrated in FIG. 7, a layer 14 having adjustable transparency is connected in such a way to the display that the layer 14 having adjustable transparency is arranged between the touch screen 11 and the display 12. In the input device 4D illustrated in FIG. 8, the operating surface 16 of the touch screen 11 comprises a hydrophobic coating 50. The input device 4E illustrated in FIG. 9 corresponds to the input device 4B illustrated in FIG. 6, wherein however the operating surface 16 of the touch screen 11 comprises a hydrophobic coating 50.

Although the invention is explained on the basis of examples of input devices having the possibility of providing a haptic feedback, the invention is naturally not limited to such input devices but rather can also be used in combination with input devices without the possibility of providing a haptic feedback.

The elements and layers in the figures are drawn with simplicity and clarity in mind and not necessarily drawn to exact scale. Thus e.g., the orders of magnitude of certain elements or layers are illustrated with considerable exaggeration as compared with other elements or layers, in order to improve the understanding of the example embodiments of the present invention.

LIST OF REFERENCE NUMERALS

1 Motor vehicle
2 Steering wheel
3 Dashboard
4, 4B, 4C, 4D, 4E Input device
10 Control unit
11 Touch screen
12 Display
13 Actuator
14 Layer having adjustable transparency
15 Housing
16 Operating surface
17 Region
20, 21 Opening
22, 23 Mounting element
24, 25, 26, 27, 31 Sleeve
30 Plug contact
40, 41 Rod
42, 43 Sliding element
44, 45 Mounting element
46, 47 Slide bearing
50 Hydrophobic coating
A Display signal
P Positional signal
S Actuator control signal
T Transparency control signal

The invention claimed is:

1. A motor vehicle input device comprising:
  an active motor vehicle display that dynamically generates a variety of images for a variable visual representation of information relevant to a driver of the motor vehicle;
  a motor vehicle touch screen arranged above the active display for the input of commands in the motor vehicle by the driver of the motor vehicle by touching an operating surface of the motor vehicle touch screen;
  a layer having adjustable transparency sandwiched between a transparent portion of a housing for the active motor vehicle display and the motor vehicle touch screen;
  the housing configured to mount to a dashboard inside the motor vehicle; and
  an actuator coupled to the housing for providing haptic feedback by vibrating the housing in response to contact by the driver of the motor vehicle with the operating surface of the motor vehicle touch screen;
  such that the layer having adjustable transparency is physically spaced apart from the active motor vehicle display at least by the transparent portion of the housing, and such that the layer having adjustable transparency is vibrated along with the motor vehicle touch screen by the actuator, while the physically spaced apart active motor vehicle display is not vibrated by the actuator.

2. An input device according to claim 1, wherein the layer having adjustable transparency comprises a plasma addressed liquid crystal (PALC) or a polymer dispersed liquid crystal (PDLC).

3. An input device according to claim 1, wherein the layer having adjustable transparency can assume an opaque state.

4. An input device according to claim 1, wherein the layer having adjustable transparency can assume an opaque state by means of an adjustable polarization.

5. An input device according to claim 1, wherein the transparency of the layer having adjustable transparency can be adjusted by means of a voltage.

6. An input device according to claim 1, wherein the operating surface of the touch screen comprises a hydrophobic coating.

7. A motor vehicle comprising:
  a dashboard inside the motor vehicle comprising:
  an active motor vehicle display that dynamically generates a variety of images for a variable visual representation of information relevant to a driver of the motor vehicle;
  a motor vehicle touch screen arranged above the active display for the input of commands in the motor vehicle by the driver of the motor vehicle by touching an operating surface of the motor vehicle touch screen;
  a layer having adjustable transparency sandwiched between a transparent portion of a housing for the active motor vehicle display and the motor vehicle touch screen;
  the housing mounted to the dashboard of the motor vehicle; and
  an actuator coupled to the housing for providing haptic feedback by vibrating the housing in response to contact by the driver of the motor vehicle with the operating surface of the motor vehicle touch screen;
  such that the layer having adjustable transparency is physically spaced apart from the active display at least by the transparent portion of the housing, and such that the layer having adjustable transparency is vibrated along with the motor vehicle touchscreen by the actuator, while the physically spaced apart active motor vehicle display is not vibrated by the actuator.

8. A motor vehicle according to claim 7, wherein the layer having adjustable transparency comprises a plasma addressed liquid crystal (PALC) or a polymer dispersed liquid crystal (PDLC).

9. A motor vehicle according to claim 7, wherein the layer having adjustable transparency can assume an opaque state.

10. A motor vehicle according to claim 7, wherein the layer having adjustable transparency can assume an opaque state by means of an adjustable polarization.

11. A motor vehicle according to claim 7, wherein the transparency of the layer having adjustable transparency can be adjusted by means of a voltage.

12. A motor vehicle according to claim 7, wherein the operating surface of the touch screen comprises a hydrophobic coating.

13. A motor vehicle input device comprising:
  an active motor vehicle display that dynamically generates a variety of images for a variable visual representation of information relevant to a driver of the motor vehicle;
  a motor vehicle touch screen arranged above the active display for the input of commands in the motor vehicle by the driver of the motor vehicle by touching an operating surface of the motor vehicle touch screen;

a housing for the active motor vehicle display and the motor vehicle touch screen, the housing comprising a layer having adjustable transparency in direct contact with the motor vehicle touch screen and physically separate from the active motor display, the housing configured to mount to a dashboard inside the motor vehicle; and an actuator coupled to the housing for providing haptic feedback by vibrating the housing in response to contact by the driver of the motor vehicle with the operating surface of the motor vehicle touch screen;

such that the layer having adjustable transparency is physically spaced apart from the active motor vehicle display, and such that the layer having adjustable transparency is vibrated along with the motor vehicle touch screen by the actuator, while the physically spaced apart active motor vehicle display is not vibrated by the actuator.

14. An input device according to claim 13, wherein the layer having adjustable transparency can assume an opaque state.

15. An input device according to claim 13, wherein the layer having adjustable transparency can assume an opaque state by means of an adjustable polarization.

16. A motor vehicle input device comprising:

an active motor vehicle display that dynamically generates a variety of images for a variable visual representation of information relevant to a driver of the motor vehicle;

a motor vehicle touch screen arranged above the active display for the input of commands in the motor vehicle by the driver of the motor vehicle by touching an operating surface of the motor vehicle touch screen;

a layer having adjustable transparency arranged between the active motor vehicle display and the motor vehicle touch screen, the layer mounted directly to the active motor vehicle display and separated from the motor vehicle touch screen;

a housing for the active motor vehicle display, the motor vehicle touch screen and the layer having adjustable transparency, the housing configured to mount to a dashboard inside the motor vehicle, the housing comprising a transparent portion between the layer and the motor vehicle touch screen; and an actuator coupled to the housing for providing haptic feedback by vibrating the housing in response to contact by the driver of the motor vehicle with the operating surface of the motor vehicle touch screen;

such that the layer having adjustable transparency is physically spaced apart from the active motor vehicle display, and such that the layer having adjustable transparency is vibrated along with the motor vehicle touch screen by the actuator, while the physically spaced apart active motor vehicle display is not vibrated by the actuator.

17. An input device according to claim 16, wherein the layer having adjustable transparency can assume an opaque state.

18. An input device according to claim 16, wherein the layer having adjustable transparency can assume an opaque state by means of an adjustable polarization.

* * * * *

UNITED STATES PATENT AND TRADEMARK OFFICE
CERTIFICATE OF CORRECTION

PATENT NO. : 9,665,175 B2  
APPLICATION NO. : 11/553666  
DATED : May 30, 2017  
INVENTOR(S) : Michael Prados et al.

Page 1 of 1

It is certified that error appears in the above-identified patent and that said Letters Patent is hereby corrected as shown below:

On the Title Page

Below item (65) insert:
--Related U.S. Application Data:
(60) Provisional application No. 60/731,033, filed on Oct. 28, 2005.--

Signed and Sealed this
Seventeenth Day of April, 2018

Andrei Iancu
*Director of the United States Patent and Trademark Office*